No. 822,711. PATENTED JUNE 5, 1906.
R. H. ATCHESON & J. H. WALSH.
RIM AND TIRE FASTENING FOR WHEELS.
APPLICATION FILED JULY 31, 1905.
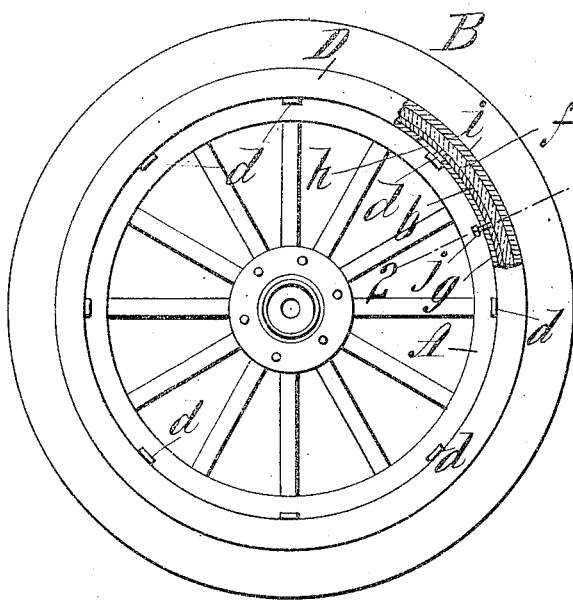
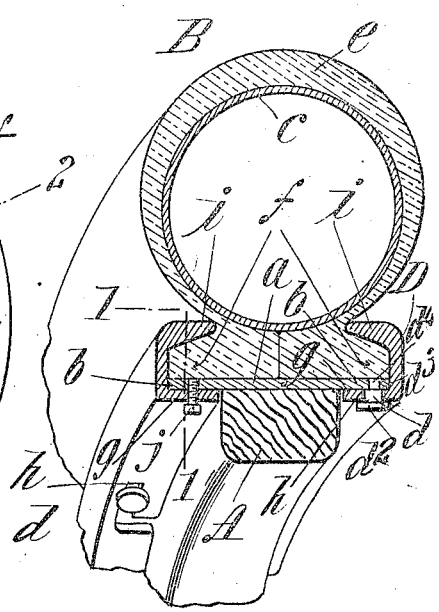
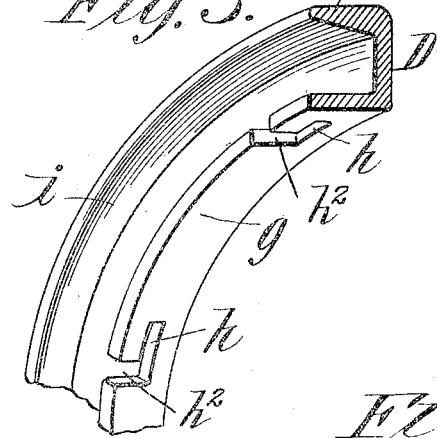
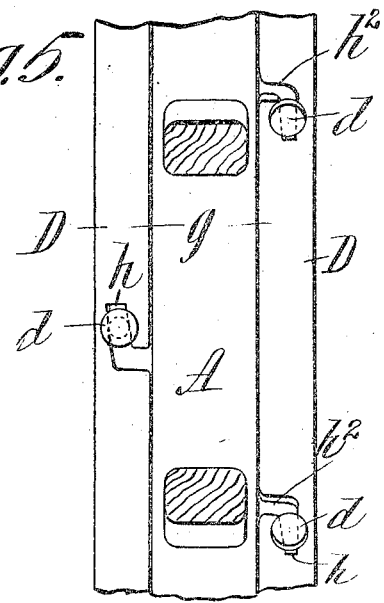
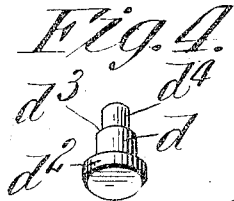
Witnesses:
Inventors:
Robert H. Atcheson
and Joseph H. Walsh.

UNITED STATES PATENT OFFICE.

ROBERT H. ATCHESON AND JOSEPH H. WALSH, OF CHICOPEE, MASSACHUSETTS.

RIM AND TIRE FASTENING FOR WHEELS.

No. 822,711.  Specification of Letters Patent.  Patented June 5, 1906.

Application filed July 31, 1905. Serial No. 271,909.

*To all whom it may concern:*

Be it known that we, ROBERT H. ATCHESON and JOSEPH H. WALSH, citizens of the United States of America, and residents of Chicopee, in the county of Hampden and State of Massachusetts, have invented certain new and useful Improvements in Rim and Tire Fastenings for Wheels, of which the following is a full, clear, and exact description.

Our invention relates to improvements in vehicle-wheels, and more particularly to means for detachably fastening the outer shoe of the pneumatic tire onto the rim or felly of the wheel.

The principal object of the invention is to provide improved constructions and arrangements of parts in and in conjunction with the wheel proper for an unusually convenient engagement and disengagement of the parts, for the assurance of secure retention of the tire on the wheel-rim at all times except when disconnection is desired, and with the requirement of extreme simplicity, cheapness, durability, and sightliness.

The invention consists in a wheel having the rim or felly thereof provided at one side with an annular tire-shoe-engaging portion and having at its other side an outwardly-projecting flange provided with a series of downwardly-projecting studs and having combined therewith a detachable tire-shoe-engaging ring provided at its lower portion with an inwardly-extending flange constructed with a series of circumferentially-extending slots having angular extensions opening to the inner edge of said inwardly-extending flange, and in certain specific features of construction of some of the parts, all substantially as hereinafter fully described, and set forth in the claims.

The improved tire-retention device is illustrated in the accompanying drawings, in which—

Figure 1 is a side view of a wheel for an automobile or other vehicle equipped with a pneumatic-tire shoe and a detachable shoe-confining device, edge portions of the structure being represented in vertical section on the plane determined by the line 1 1 on Fig. 2. Fig. 2 is a cross-sectional view, on a larger scale, as taken on the line 2 2, Fig. 1. Fig. 3 is a perspective view of a portion of one of the novel annular tire-shoe retainers. Fig. 4 is a perspective view of one of a series of studs provided in the wheel. Fig. 5 is a face view of an inner portion of the wheel-rim or felly, showing portions of the oppositely-located tire-shoe-retaining rings in their positions on the wheel.

Similar characters of reference indicate corresponding parts in all of the views.

In the drawings, A represents the wooden felly of the wheel provided at its outer circumferential portion with a flat annular metallic section $a$, extending to constitute flanges $b\ b$, horizontally and outwardly protruding beyond the opposite sides of the felly proper. Said flange-like extensions are provided with a regularly-spaced series of studs $d$, which, as shown in Fig. 2, project inwardly—that is, with their axes parallel with the face-planes of the wheel, or, otherwise stated, as at right angles to the wheel-axis.

These studs, as represented in Figs. 2 and 4, have head-flanges $d^2$, which are shouldered, as represented at $d^3$, and have their shanks $d^4$ fitted and riveted in holes therefor in the flange-like extensions $b$ of the aforesaid metallic felly-section; but the mode of securing the studs to the portion $b$ may be otherwise than by riveting.

B represents the pneumatic tire, of which $c$ is the inner tube and $e$ is the shoe, which in the present instance is represented as of a somewhat common type cleft at its bottom to be spread open thereat and having annular feet or base portions $f\ f$, which rest on the overhanging felly-section.

D D represent the pair of detachable tire-shoe-engaging rings each provided at its inner portion—that is, its portion nearer its axial center—with a transversely and inwardly extending flange $g$, constructed with a series of substantially circumferentially extending and comparatively short slots $h$, having angular extensions $h^2$, opening to the inner edge of said inwardly-extending flange $g$. These tire-shoe-engaging rings are at their outer portions constructed and adapted, as occasion may require, for the retention of tire-shoes of various specific forms, and for coaction with shoes of the kind here illustrated the rings D are constructed with the inwardly-protruding annular and beveled flanges $i\ i$.

Assuming that the tire-shoe is properly in place on the felly, the retaining-ring is brought to place sidewise in relation to the metallic flange b, the ring-flange g being peripherally adjacent the inner surface of the felly-flange and the transverse slot extensions matching with the fixed studs d. The ring is then moved bodily inwardly relatively to the wheel on the line of its axis until a position of the ring is assumed which brings the circumferential line imagined to pass through the intermediate portions of all of the longitudinal slots h of the series coincident with the axes of the studs, whereupon the securing-ring is given a slight degree of rotative motion to perfect the engagement of the ring with the felly, as clearly to be perceived in the drawings.

For the purpose of locking the parts in their engaged positions a set-screw j is provided to penetrate the ring-flange g and the felly-flange b in the manner shown in Fig. 2.

A reversal of the action described for engaging and fastening the tire-shoe retaining parts is manifestly followed for the detachment of such parts and the removal or partial displacement of the shoe.

It is advantageous to construct the longitudinal boundaries of the slots h inclined to the side or face plane of the wheel, so that in the slight rotative movement to be given to the securing-ring, as above described, there may be a crowding action relatively between the studs and slot sides for automatically acquiring a pressure in an inward direction of the ring-flange i relatively to the base or foot flange of the tire-shoe.

It may be sufficient in many cases to provide the detachable tire-shoe-engaging ring only at one side of the wheel-rim, the tire-shoe engaging means at the opposite side of the wheel-rim being of any character having fitness to the purpose, and it is a matter of mere election on the part of the constructor whether a single ring or duplicated detachable tire-shoe-engaging rings be provided for coaction with the wheel-rim, substantially as described.

Having thus described our invention, what we claim, and desire to secure by Letters Patent, is—

1. In a wheel, a felly, a flat metallic band secured thereto, and having outstanding portions on opposite sides thereof extending in the plane of the periphery of the felly, a plurality of radially inwardly projecting headed studs secured to said outstanding portions of the metallic band, and separate, annular substantially U-shaped tire-shoe-engaging rings located upon opposite sides of the felly and each ring having one of its parallel walls provided with a plurality of angular slots opening to the outer edge of the wall, the said walls of the rings being in overlapping engagement with the outstanding portions of the metallic band and the headed studs in interlocking engagement with the angular slots.

2. A wheel having a felly provided at its outer circumferential portion with a metallic annular section extending to constitute flanges, horizontally and outwardly beyond the opposite sides of the felly proper, and said flange-like extensions being provided with a series of radially inwardly projecting studs, a pair of detachable tire-shoe-engaging rings each provided at its inner portion with a transversely inwardly extending flange constructed with a series of substantially circumferentially extending slots opening to the inner edge of said flange, and means for confining the detachably-engaged shoe-engaging rings against rotative movement relatively to the wheel-rim.

Signed by us at Springfield, Massachusetts, in presence of two subscribing witnesses.

ROBERT H. ATCHESON.
JOSEPH H. WALSH.

Witnesses:
  WM. S. BELLOWS,
  JULIUS D. GARFIELD.